United States Patent Office 3,405,660
Patented Oct. 15, 1968

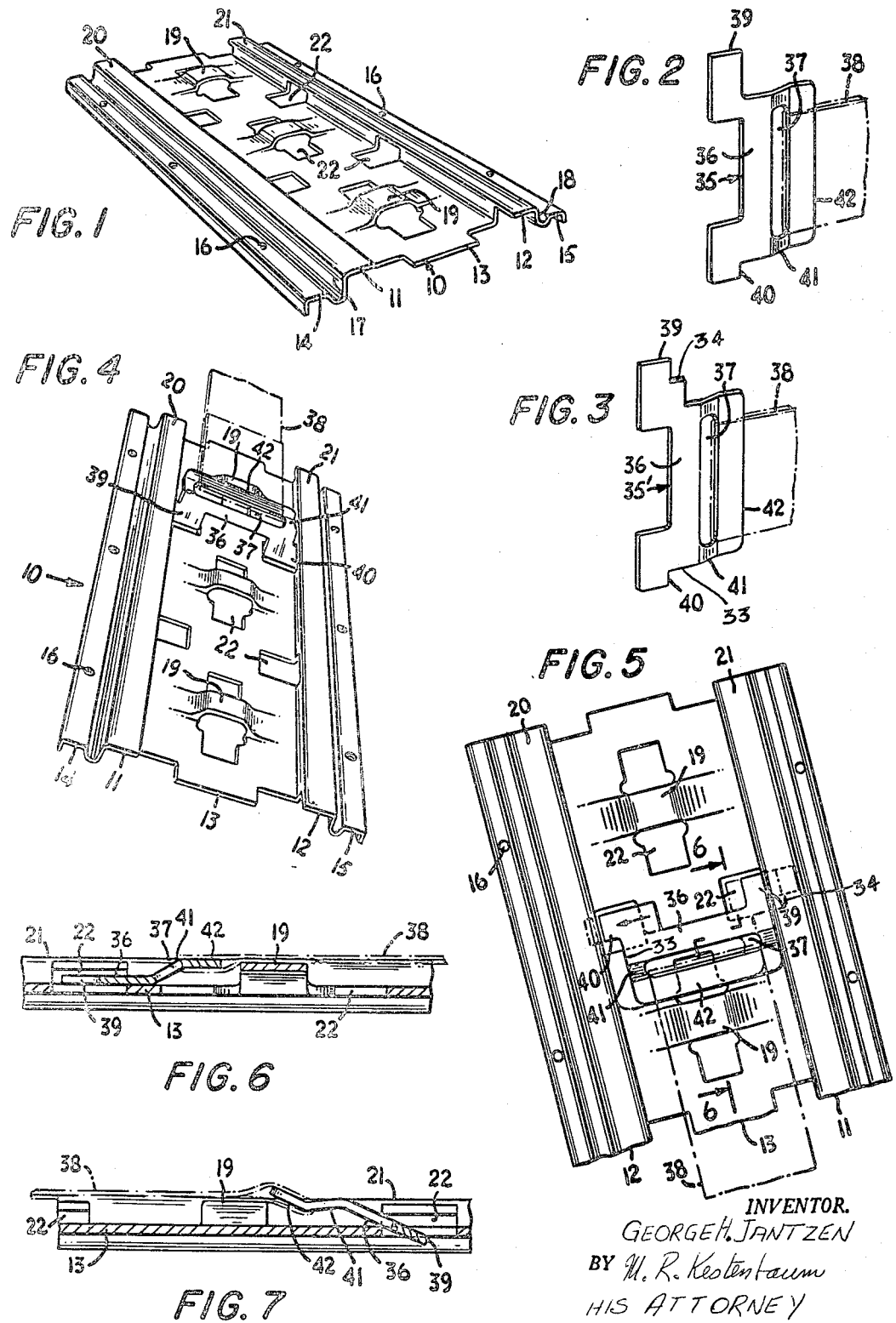

3,405,660
LOAD CONTROL SYSTEMS
George H. Jantzen, New York, N.Y., assignor to M. Steinthal and Company Incorporated, New York, N.Y., a corporation of New York
Continuation-in-part of application Ser. No. 489,096, Sept. 1, 1965. This application July 28, 1967, Ser. No. 656,806
6 Claims. (Cl. 105—369)

ABSTRACT OF THE DISCLOSURE

The connector attaches a flexible strap to a channelled track mounted along the inside walls of a truck trailer and allows cargo to be placed against the track directly in front of the connector.

The connector has oppositely disposed tongues of unequal length which fit into oppositely disposed apertures in the track and is jogged where the strap attaches to it.

---

This application is a continuation-in-part of my copending patent application Ser. No. 489,096, filed on Sept. 1, 1965, now U.S. Patent 3,367,286, the benefit of which is claimed for this application.

This invention relates to load controlling devices and more particularly load controlling devices to be used in a cargo space such as a railroad box car, a truck trailer, a van and the like.

In the transportation of cargo in a moving vehicle, it is often necessary to provide means for preventing the cargo from shifting its position within the vehicle. Shifting causes damage both to the cargo and to the vehicle. A common practice is to strap the cargo to an anchor rigidly affixed to the inner wall of the vehicle. Another practice is to place wooden beams tranversely across the cargo space of the vehicle to restrain the load. These beams are attached at both ends to anchors rigidly affixed to the inner wall of the vehicle by suitable supports.

It is known to use an elongated track rigidly affixed to the inner wall of the vehicle as the anchor to which the restraining beams or straps are connected. The prior known straps and beams are provided with connectors and supports respectively, which cooperate with apertures in the track.

The connector most commonly used between the restraining strap and the wall track is one which protrudes into the cargo space. This prevents a load from being placed flush against the inner wall of the vehicle directly in front of the connector and also increases the chance that the load will be damaged. Also, such a connector has a limited degree of pivotal freedom within the track so that for many strapping applications there is an angle between the connector and the restraining strap. Because of this absence of "in-line" loading, there is a tendency for the connector to be physically distorted due to the forces exerted on it by the restraining strap. Also there is a tendency for the restraining strap to be rapidly worn through at the region where it is attached to the connector.

It is therefore an object of the present invention to provide an anchoring track and strap connector which will permit loading a cargo flush against a wall at the point where the strap connector easily engages and disengages the track.

A further object of the present invention is to provide such an anchoring track and strap connector in which the track can be mounted either vertically or horizontally in a cargo handling space.

Another object of the present invention is to provide a connector for a restraining strap which easily engages and disengages the anchoring track to have approximately 180 degrees of pivotal freedom.

A still further object of the present invention is to provide a connector for a restraining strap which cooperates with the anchoring track to have "in-line" loading at any angle.

To these ends, the invention provides an anchoring track having a recessed channel to accommodate the strap connectors and has load supporting shoulders. The track can be mounted either horizontally or vertically and will provide the same load supporting characteristics in either position. A still further feature of the invention is a connector which can lay flat within the recessed channel of the anchoring track, which provides 180 degrees of "in-line" loading and which has minimum bending characteristic and high load bearing characteristics.

The invention will be better understood from the following more detailed description taken in conjunction with the accompanying drawings in which:

FIGURE 1 shows an anchoring track suitable for horizontal or vertical mounting.

FIGURES 2 and 3 show two embodiments of strap connectors.

FIGURES 4 to 7 show the strap connector of FIGURES 2 and 3 connected to the track shown in FIGURE 1.

Referring to FIGURES 1 and 4 a track or anchor member is shown generally as 10 to which a beam support or strap connector can be removably affixed. Track 10 is adapted to be secured along the inside walls of the vehicle in either a vertical or horizontal position. In vehicles where it is desired to carry loads in tiers, such as where the loads cannot be stacked one upon the other due to the fragility or peculiar design of the bottom load, track 10 can be secured to the inner wall of the vehicle in a vertical position. For other loads which can be secured by simple strapping or shoring techniques, a horizontal installation of the track may be more desirable. The same track serves equally well in either position.

Track 10 has two shoulder members 11 and 12 connected by web 13. Formed along the edges of track members 10 are smaller shoulder members 14 and 15, having fastening holes 16 therein. The track is secured to the structural members (not shown) of the vehicle wall by suitable fastening means (also not shown) through holes 16. The paneling on the inner surface of the vehicle wall is then secured to the structural members of the vehicle wall so that the panelling covers the smaller shoulder members 14 and 15 and abuts the outer surfaces 17 and 18 of the shoulder members 11 and 12. Using panelling of appropriate thickness so that its surface lies flush with the upper surface of shoulder members 11 and 12, the inner wall of the vehicle appears as a smooth surface with no projections to snag or damage the load and the web 13 of track 10 appears as a recessed channel within the vehicle wall.

Track 10 is also provided with a plurality of ribs or cross members 19 extending transversely across web 13. Ribs 19 advantageously extend to lie in the plane of the upper surfaces 20 and 21 of shoulder members 11 and 12.

As can be seen in FIGURE 1, track 10 is provided with a plurality of apertures 22 which begin on web 13 and extend into the shoulder members 11 and 12 or cross members 19. As can also be seen, apertures 22 are arranged in pairs, an aperture extending into one shoulder member 11 lying directly opposite a second aperture extending into the other shoulder member 12 and an aperture 22 extending into one cross member 19 lying directly opposite a second aperture 22 extending into a second cross member 19.

As will be explained in more detail hereinbelow, the apertures 22 are adapted to cooperate with strap connectors used to secure the load in the vehicle.

FIGURES 2 to 7 show a strap connector 35 and said strap connector inserted and connected in the track 10 respectively. In FIGURE 2, strap connector 35 comprises a substantially flat piece 36 having an elongated slot 37 therein. A strap 38 is inserted through slot 37 and folded back upon itself about the strap engaging member 42 and contiguous portions of the strap suitably fastened together, as by stitching. The flat piece 36 of the connector 35 is provided with two tongue members 39 and 40.

Tongue member 39 is longer than tongue member 40. This is to facilitate insertion and removal of the strap connector 35 into and from the track 10. Tongue member 39 has a wider shoulder portion 34 thereon in the embodiment of strap connector 35' shown in FIGURE 3.

Referring to FIGURE 5 the apertures 22 of the track 10 and the tongue members 39 and 40 of the connector 35 cooperate in the following manner: First the longer tongue 39 is obliquely placed within the upper one of the aperture 22 and inserted as far as it can go; this permits the shorter tongue 40 to clear the lower shoulder member 12. The connector 35 is then moved downward so that shorter tongue 40 can be easily inserted into the lower one of the paired and opposite apertures 22.

As can be further seen in FIGURES 2 to 7, connector 35 has a jogged portion 41 therein. The jogged portion 41 permits the strap engaging member 42 to be spaced from the web 13 so that the thickness of the strap 38 will not interfere with the tongue members 39 and 40 being flush against the web 13. Advantageously in the flush position, the strap engaging member 42 lies at or below the surface 20, 21 of the shoulders 11 and 12.

It is to be noted that while the above discussion is in terms of a horizontally positioned track, the discussion is equally applicable to a vertically positioned track. In a vertically positioned track, the connector 35 would cooperate with pairs of opposite apertures 22 which extend into the cross members 19.

It will be readily apparent that the engagement between the connector tongues 39 and 40 and the shoulder members 11 and 12 permits the connector to pivot in the track 10. In effect, connector 35 is pivotably engaged with the track 10, having a large degree of angular freedom. For example, if by virtue of a particular load, strap 38 is pulled to the right, the connector 35 will position with the strap 38 in that direction. Similarly, if by virtue of a particular load, strap 38 is pulled to the left, the connector 35 will pivot to an "in-line" position with the strap 38 in that direction. In other words, because of the particular engagement of the tongues 39 and 40 with shoulder members 11 and 12 the connector 35 remains in line with the strap. Furthermore, at any angle of the connector to the track the strap will not pull at an angle to the connector which could produce undesirable bending forces on the connector. "In-line" loading greatly reduces the wear and tear that the strap is subjected to at the portion thereof attached to the connector. In prior known strap connectors, the pivotal movement of the connector is restricted with respect to the wall of the vehicle. Therefore, when, by virtue of the loads being supported, the strap is pulled in different directions, there is rubbing between the strap and the connector. This rubbing weakens the strap and eventually causes it to fail.

Strap connector 35 thus minimizes or eliminates bending characteristics which limit the load retaining abilities of known connectors. In strap connector 35 the load is retained as sheer stress across the tabs 39, 40 and high load carrying capacities are achieved.

In a vehicle equipped with the track 10 and strap connector 35, a load can be placed flush against the vehicle's inner wall directly in front of the connector 35. As mentioned above, the track 10 has no portion thereof protruding beyond the vehicle panelling. Also, when the connector 35 is so positioned that it lays fully within the track 10, the strap 38 can extend along the web within the recessed channel formed by the shoulder members 11 and 12 and no part of the connector will protrude beyond the panelling. Thus, it is possible to place a load, for example, a substantially cubic crate, flush against the vehicle wall directly in front of the strap connector 35. In this arrangement, the strap 38 will run in the recessed channel until reaching the edge of the crate. Then the strap can be brought out of the recessed channel and wrapped around the crate.

The widened shoulder portion 34 on tongue member 39 of connector 35' serves in aid of a number of the above described advantages. Shoulder 34 provides additional width to the longer tongue member 39 at the point where a larger bending moment would be built up due to the greater length of tongues 39 compared to tongue 40.

As shown in FIGURE 5, when the connector 35 is inserted in the track 10 and moved downward it will rest at its lower edge 33 upon the lower shoulder member 12. The shoulder portion 34 is dimensioned to pass from within the upper shoulder 11 to be fully from it in this position. The upper edge of shoulder portion 34 will then rest at or very near to the inner face of shoulder member 11. In this way, the shoulder portion 34 cooperates with lower edge 33 to maintain the tongue member 40 engaged within the lower aperture 22 under severest conditions and vibrations in use at any angle.

The cooperation of shoulder portion 34 and the connector lower edge 33 also serves to rest one or other of them against an inner face of shoulder members 11 or 12. With the track 10 oriented horizontally, should the strap 38 extend at somewhat of an upwards or downwards angle to the track 10, the shoulder members 11, 12 will provide shelf support surfaces for the connector 35' to reduce the increased bending and shear forces which would otherwise appear at one or other of the tongues 40, 39. Moreover, the cooperation of the shoulder portion 34 and the connector lower edge 33 tends to hold the pivot axis of the retractor 35' in position normal to the longitudinal axis of the track 10 throughout its arc of pivotal freedom.

With the track oriented vertically similar results are obtained through the cooperation of the shoulder portion 34 and the retractor lower edge 33 between the cross members 19.

Although my invention has been shown and described with reference to particular embodiments it should be understood that departures may be made therefrom within the scope of my invention as set forth in the following claims.

What is claimed is:

1. Load control apparatus comprising an elongated track capable of being secured to a vehicle wall having a pair of spaced opposed shoulder members extending outwardly from a web portion therebetween and thus forming a longitudinal elongated recessed channel and a series of pairs of spaced opposed apertures commencing in said web portion and extending into opposed portions of said shoulder members and a strap connector for releasably securing a load-restraining strap to said track having a body portion, means for attaching said strap to said body portion, a pair of oppositely disposed tongue members extending from said body portion and adapted to extend into respective ones of said shoulder members through respective ones of a pair of said opposed apertures to pivot in said apertures with a substantial degree of pivotal freedom, said body portion having an indented portion between said tongue members of a length sufficient to span the space between said apertures.

2. Load control apparatus according to claim 1 in which a series of spaced opposed shoulder members extend outwardly from said web portion transversely to the longitudinal axis of said track each having a pair of spaced opposed apertures commencing in said web portion and extending into opposed portions thereof, said strap connector being adapted to extend into respective ones of said transverse shoulder members through respective ones of a pair of said opposed apertures therein.

3. Load control apparatus according to claim 1 in which said body portion has a portion thereon extending in the same direction as the longer one of said tongue members, said body portion and said extending portion being dimensioned for closer fit within said recess than said body portion alone.

4. Load control apparatus according to claim 1 in which said body portion and attaching means are each dimensioned to fit within said channels between said shoulder members with said tongue members extending into said shoulder members.

5. Load control apparatus according to claim 1 in which said attaching means is jogged from said body portion approximately the thickness of said strap.

6. Load control apparatus according to claim 1 in which the longer one of said tongue members has a shoulder portion thereon, said body portion and said shoulder portion being dimensioned for closer fit within said channel than said body portion alone.

References Cited

UNITED STATES PATENTS

| | | | |
|---|---|---|---|
| 2,927,956 | 3/1960 | Reisch. | |
| 2,891,490 | 6/1959 | Elsner | 105—369 |
| 2,984,885 | 5/1961 | Elsner | 105—369 XR |
| 3,017,679 | 1/1962 | Elsner | 105—369 XR |
| 3,128,106 | 4/1964 | Zinkel | 280—179 |

DRAYTON E. HOFFMAN, *Primary Examiner.*